(12) United States Patent
Schad et al.

(10) Patent No.: US 10,347,396 B2
(45) Date of Patent: Jul. 9, 2019

(54) CABLE JACKET FOR AN ELECTRICAL OR OPTICAL CONDUCTOR

(71) Applicant: Tyco Electronics Raychem GmbH, Ottobrunn (DE)

(72) Inventors: Norbert Schad, Hohenlinden (DE); Denny Hellige, Neubiberg (DE)

(73) Assignee: Tyco Electronics Raychem GmbH, Ottobrunn (DE)

( * ) Notice: Subject to any disclaimer, the term of this patent is extended or adjusted under 35 U.S.C. 154(b) by 0 days.

(21) Appl. No.: 14/594,689

(22) Filed: Jan. 12, 2015

(65) Prior Publication Data
US 2015/0221416 A1    Aug. 6, 2015

Related U.S. Application Data

(63) Continuation of application No. PCT/EP2013/064084, filed on Jul. 3, 2013.

(30) Foreign Application Priority Data

Jul. 12, 2012 (DE) .................. 10 2012 212 205

(51) Int. Cl.
*H01B 7/295* (2006.01)
*H01B 7/29* (2006.01)
(Continued)

(52) U.S. Cl.
CPC ............ *H01B 7/295* (2013.01); *G02B 6/443* (2013.01); *G02B 6/4436* (2013.01); *H01B 7/292* (2013.01);
(Continued)

(58) Field of Classification Search
CPC .......... H01B 7/29; H01B 7/292; H01B 7/295; G02B 6/443; G02B 6/4436; G02B 6/44;
(Continued)

(56) References Cited

U.S. PATENT DOCUMENTS 3,823,255 A * 7/1974 La Gase ................ H01B 7/295
174/113 R
3,928,210 A * 12/1975 Peterson ................ C09D 5/18
106/18.18
(Continued)

FOREIGN PATENT DOCUMENTS

DE     9216599 U1    2/1993
DE    29724611 U1    4/2005
(Continued)

OTHER PUBLICATIONS

PCT Notification of Transmittal of the International Search Report and the Written Opinion of the International Searching Authority, International Application No. PCT/EP2013/064084, dated Nov. 6, 2013, 8 pages.
(Continued)

*Primary Examiner* — Dimary S Lopez Cruz
(74) *Attorney, Agent, or Firm* — Barley Snyder

(57) ABSTRACT

A cable jacket for a conductor is disclosed having a flame-retardant insulation and a gas-permeable, heat-resistant outer casing. The flame-retardant insulation is positioned over the conductor so as to at least partially surround the conductor. The gas-permeable, heat-resistant outer casing surrounds the flame-retardant insulation.

20 Claims, 4 Drawing Sheets

(51) Int. Cl.
*G02B 6/44* (2006.01)
*H02G 15/04* (2006.01)
*H02G 15/18* (2006.01)

(52) U.S. Cl.
CPC .......... *H02G 15/046* (2013.01); *H02G 15/18* (2013.01); *H02G 15/182* (2013.01); *H02G 15/1806* (2013.01)

(58) Field of Classification Search
CPC .. H02G 15/18; H02G 15/1806; H02G 15/182; C09K 21/00; E04B 1/94; A62C 2/065
USPC ............ 385/100–114; 174/110 R, 139, 68.1, 174/70 R, 120 R, 121 R, 121 A, 119 C, 174/122 R, 120 C, 124 R
See application file for complete search history.

(56) References Cited

U.S. PATENT DOCUMENTS

| | | | | |
|---|---|---|---|---|
| 4,018,983 | A * | 4/1977 | Pedlow | C08K 13/04 106/18.24 |
| 4,064,359 | A * | 12/1977 | Peterson | H01B 3/06 174/107 |
| 4,280,225 | A * | 7/1981 | Willis | H01Q 1/002 174/102 SP |
| 4,513,173 | A * | 4/1985 | Merry | G02B 6/4436 138/103 |
| 4,676,025 | A * | 6/1987 | Mattscheck | E06B 7/2314 169/48 |
| 4,756,945 | A * | 7/1988 | Gibb | E04B 1/941 428/124 |
| 5,173,960 | A * | 12/1992 | Dickinson | G02B 6/4403 174/121 A |
| 5,304,740 | A * | 4/1994 | Bozell | H01B 3/441 174/110 PM |
| 5,433,991 | A * | 7/1995 | Boyd, Jr. | D03D 15/12 139/420 C |
| 5,750,927 | A * | 5/1998 | Baltazar | A62C 3/16 169/48 |
| 5,799,705 | A * | 9/1998 | Friedrich | F16L 9/12 138/140 |
| 6,340,794 | B1 * | 1/2002 | Wandmacher | H02G 15/068 174/73.1 |
| 6,392,152 | B1 | 5/2002 | Mottine et al. | |
| 7,695,331 | B2 * | 4/2010 | Kerner | H01R 4/20 174/15.6 |
| 2003/0185527 | A1 * | 10/2003 | Morris | F16L 9/19 385/100 |
| 2007/0224886 | A1 | 9/2007 | Rodway | |
| 2007/0251595 | A1 * | 11/2007 | Chen | D02G 3/16 139/420 C |
| 2009/0200061 | A1 * | 8/2009 | Tonucci | H01B 7/292 174/113 R |
| 2009/0266591 | A1 * | 10/2009 | Amou | C08J 5/24 174/258 |
| 2010/0108171 | A1 * | 5/2010 | Relats Manent | F16L 57/04 138/125 |

FOREIGN PATENT DOCUMENTS

| | | |
|---|---|---|
| DE | 202007004369 U1 | 8/2007 |
| EP | 0127432 A2 | 5/1984 |
| EP | 0646936 A1 | 4/1995 |
| EP | 1074998 A2 | 2/2001 |

OTHER PUBLICATIONS

Peter Burger, "Zwei Welten: Isolations- und Funktionserhalt, Sicherheitskabel für den Brandfall" ("Two Worlds: Maintaining insulation and operation, safety cables for the event of a fire") Bulletin SEV/VSE 23/05, pp. 27 to 28.
English translation of the Chinese Second Office Action, dated Nov. 2, 2016, 12 pages.
Chinese Second Office Action, dated Nov. 2, 2016, 9 pages.
European Communication, European Patent Application No. 13 734 069.1, dated Dec. 13, 2018, 5 pages.

* cited by examiner

CABLE JACKET FOR AN ELECTRICAL OR OPTICAL CONDUCTOR

CROSS-REFERENCE TO RELATED APPLICATION

This application claims priority under 35 U.S.C. § 119 (a)-(d) to German Patent Application No. 10 2012 212 205.2, dated Jul. 12, 2012, and to PCT Application No. PCT/EP2013/064084, dated Jul. 3, 2013.

FIELD OF THE INVENTION

The present invention relates to a cable jacket for an electrical or optical conductor, the use of a gas-permeable, heat-resistant and preferably mechanically flexible casing in such a cable jacket and a construction kit for producing a cable connection.

BACKGROUND

In most cases in which information or energy is transported via electrical or optical conductors, there are stringent requirements for maintaining operation in the event of a fire. Conventionally, multi-layer coverings of an inorganic textile material are used, such as basalt, silica, ceramic material or glass fibre, in combination with a silicone coating which is filled with a flame-retardant means, as illustrated, for example, in WO 2012/033609 A1 or US Patent Application No. 2007/0251595 A1. Another protective covering with an internal glass fiber cladding and a silicone rubber cladding may also be applied, such as that disclosed in European Patent Application No. 0127432 A2.

These known protective coverings are based on the idea of providing textile inorganic carriers with an external flame-retardant coating in order to maintain a cable or a line in an operational state for as long as possible, even in the event of a fire.

As set out in the article Peter Burger "Zwei Welten: Isolations-und Funktionserhalt, Sicherheitskabel für den Brandfall" ("Two Worlds: Maintaining insulation and operation, safety cables for the event of a fire") Bulletin SEV/VSE 23/05, pages 27 to 28, cables that are used in commercial tower blocks, department stores, hospitals or tunnels and nuclear power stations must comply with both the insulation maintenance test in accordance with IEC 60331, and must pass a standard relating to the maintenance of function, in accordance with DIN 4102-12.

As such, the known arrangements therefore encase the textile carrier with a particularly high-quality silicone rubber layer which is filled, for example, with boron.

A disadvantage in the known approaches is the relatively high material complexity, which results in a more difficult capacity for assembly when producing cable connections in situ.

There is a need for both a cable jacket and connector kit to reliably perform cable connections in a cost-effective and simple manner, while ensuring the operation of a cable assembly in the event of a fire.

SUMMARY

A cable jacket for a conductor has a flame-retardant insulation and a gas-permeable, heat-resistant outer casing. The flame-retardant insulation is positioned over the conductor so as to at least partially surround the conductor. The gas-permeable, heat-resistant outer casing surrounds the flame-retardant insulation.

BRIEF DESCRIPTION OF THE DRAWINGS

The invention will now be described by way of example, with reference to the accompanying Figures, of which:

FIG. 4-1 is a perspective view of an assembly step for producing a cable connection, where an electrical insulation is provided;
FIG. 4-2 is a perspective view of an assembly step for producing the cable connection, where an outer casing is pushed over a conductor;
FIG. 4-3 is a perspective view of an assembly step for producing the cable connection, where a hermetically sealing outer bushing is fitted;
FIG. 4-4 is a perspective view of an assembly step for producing the cable connection, where the outer bushing is heat-shrunk;
FIG. 5-1 is a perspective view of an assembly step for producing a cable end closure, where an outer casing is pushed over a cable lug;
FIG. 5-2 is a perspective view of an assembly step for producing the cable end closure, where a hermetically sealing first outer bushing is heat shrinked;
FIG. 5-3 is a perspective view of an assembly step for producing the cable end closure, where a hermetically sealing second outer bushing is heat shrinked.

DETAILED DESCRIPTION OF THE PREFERRED EMBODIMENT(S)

Figure 1:
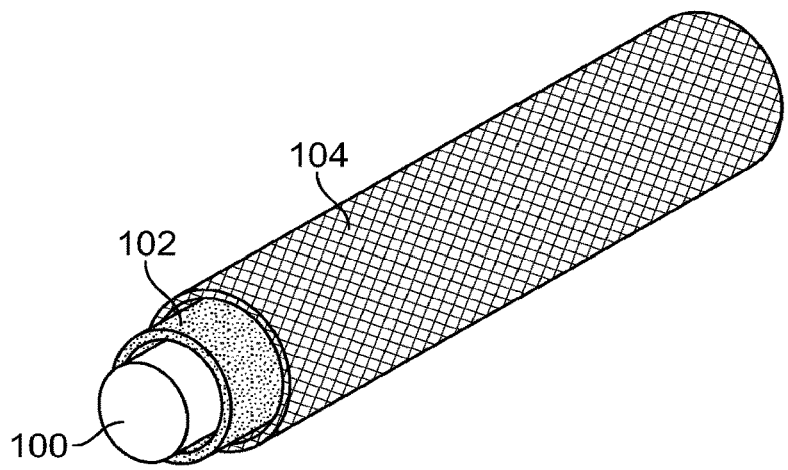
FIG. 1 is a perspective view of a cable jacket.

FIG. 1 shows an embodiment of an electrical or optical conductor 100 surrounded by an insulation 102 and an outer casing 104 which is constructed in an electrically insulating manner. The conductor 100 may be a copper line of a low-voltage cable assembly, the insulation 102 already having been fitted in the factory. In an embodiment, the conductor 100 is an optical conductor.

The insulation 102 comprises an insulating material which is filled with flame-retardants and which is conventional for use with such cables or end closures. In the embodiment of FIG. 1, a braiding in the form of a tube is fitted as an outer casing 104 produced from quartz. The outer casing 104 forms a cable jacket for enclosing the insulation remaining in the event of a fire. Since the outer casing 104 is gas-permeable, gaseous combustion products which occur in the presence of a fire can be safely discharged without bringing about a significant deformation of the outer casing 104. The remaining, mostly mineral residual portions of the insulation 102, are retained at their original location by the outer casing 104 in the event of a fire so that the operational capacity of the insulation is maintained for a specific period of time. Table 1 discloses the mechanical and physical properties of an exemplary embodiment of the quartz material which is particularly suitable for the outer casing 104.

TABLE 1

| Chemical composition | |
|---|---|
| Components | ≥99.95% $SiO_2$ |
| Chemical changes under the influence of temperature: | none |
| Mechanical properties | |
| Filament diameter | 11 μm |
| Specific density | 2.2 g/$cm^3$ |
| Tensile strength in the unaffected state | 6000 N/$mm^2$ |
| Tensile strength in the wound state | 3000-4000 N/$mm^2$ |
| Modulus of elasticity | 78 GPa |

TABLE 1-continued

Thermal properties

| | |
|---|---|
| Long-term temperature stability | 1000° C. |
| Softening temperature at approx. | 1650° C. |
| Linear expansion coefficient 0° C.-400 °C. | $3.9 \times 10^{-7}$ |
| Linear expansion coefficient 400° C.-1200° C. | $5.4 \times 10^{-7}$ |
| Specific heat capacity c (J/Kg-K) | 14.246 |
| Thermal conductivity W/(m × K) for solid quartz glass | 0.0348 |
| for processed quartz glass | Depending on processing form |

Electrical properties

| | | |
|---|---|---|
| Dielectric constant at $10^6$ Hz | | 3.78 |
| Dielectric loss factor at $10^6$ Hz | | 0.0001 |
| Specific resistance at | 20° C. (Ω × cm) | $10^{19}$ |
| | 250° C. (Ω × cm) | $10^{10}$ |
| | 1200° C. (Ω × cm) | $2 \times 10^7$ |

A significant advantage is that the outer casing 104 can follow the deformations of the heated conductor 100 in the event of a fire, while the insulation material 102 remains operational in situ when the conductor 100 has been significantly deflected from an original position. In an embodiment, the outer casing 104 is formed through a braiding operation, to form a tube. In other embodiments, the outer casing 104 is formed from a knitted fabric, woven fabric, fleece or felt.

One of ordinary skill in the art would appreciate that the insulation 102 can also be maintained by an outer casing 104 that is rigid in the final assembled state.

The outer casing 104 retains a large portion of the burnt insulation material in place in the event of a fire, whilst gases and vapours can be dissipated. The insulation material 102 remaining in the event of a fire is fixed at the original location and a functionally enduring insulation is consequently maintained for a specific period of time. In an embodiment whereby the conductor 100 is formed of a plurality of cable strands of differing polarity, the strand insulation is maintained.

Furthermore, the burnt insulation 102, which remains fixed in position by the outer casing 104, also forms a temperature barrier, temporally shields the conductor 100 from the elevated external temperatures.

Figure 2:
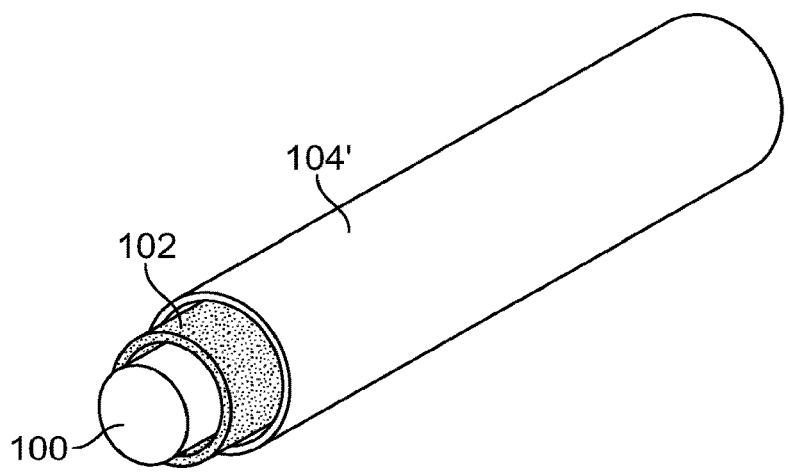
FIG. 2 is a perspective view of a cable jacket.

In an embodiment of FIG. 2, the outer casing 104' is formed as tubular, membrane-like structure from suitable glass fibre or quartz fibre filter.

Figure 3:
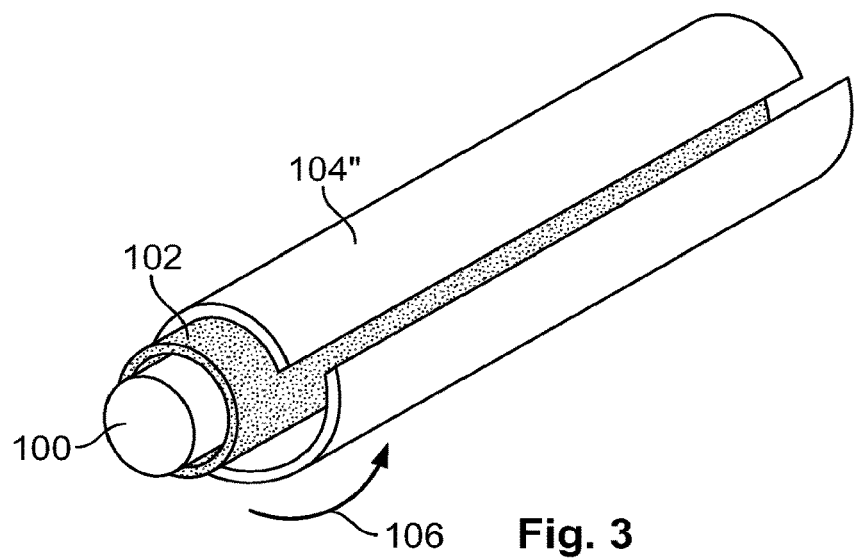
FIG. 3 is a perspective view of a cable jacket.

In an embodiment of FIG. 3, the outer casing 104" is formed by a mat which is rectangular in the initial state, and which is placed in the direction of the arrow 106 around the insulation 102 on the conductor or the cable strand 100. The blank of the mat in the pre-assembled state may naturally have any shape, and the edges thereof can be secured after the assembly through adhesive bonding. Advantageously, the insulation 102 in this embodiment, in addition to the inorganic flame-retardant means, also may contain intumescent flame-retardants that produce foaming in the event of a fire, and thereby fill any gap which may be present at the location of the joint.

Figures 2, 4:
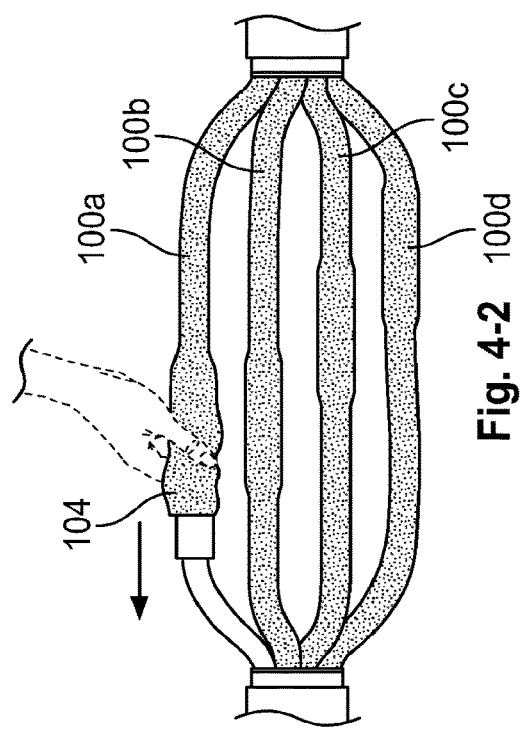
Figure 4:
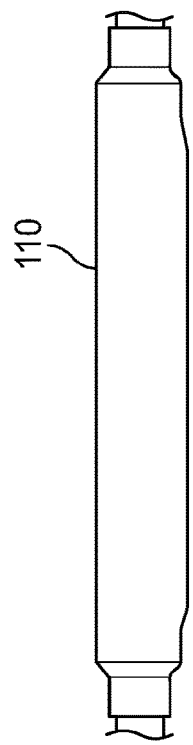
Figures 1, 4:
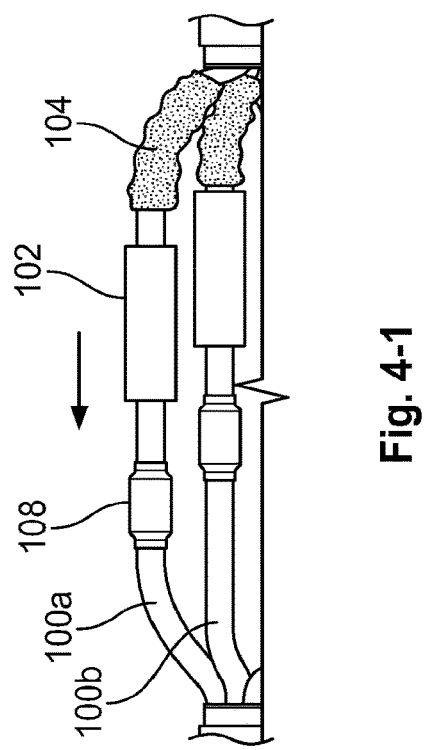
Figures 3, 4:
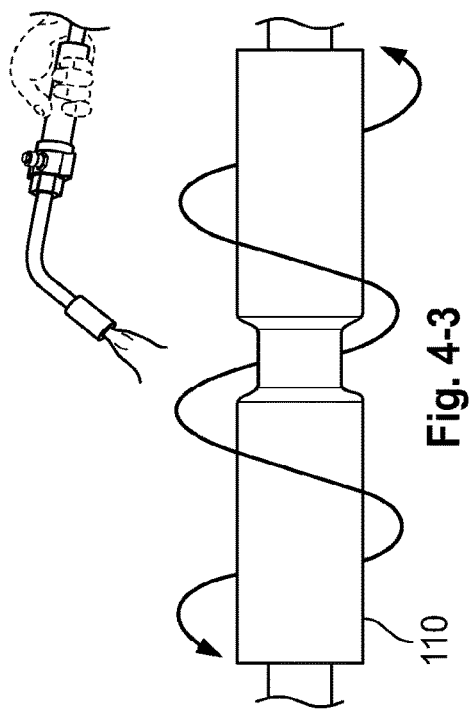

FIG. 4 schematically illustrates by way of example the connection of a large number of cable strands using the cable jacket according to the invention. The individual strands or conductors 100a, 100b, 100c and 100d of a four-strand cable which is shown in this instance have the insulation removed in the region in which they are intended to be connected to the corresponding counter-piece and are connected to each other by means of electrically conductive connection pieces 108, for example, by means of a crimp connection.

In an embodiment of FIG. 4-1, each connection region 108 is provided with the electrical insulation 102. The electrical insulation 102 can be pushed over the connection region 108, and is in the form of an electrically insulating inner casing, the insulation substantially corresponding in terms of its properties to the strand insulation of the individual strands which was applied in the factory and which was removed for the connection.

In the embodiment of FIG. 4-2, an outer casing 104 is pushed over each of the strands or conductors 100. Consequently, the strand arrangement in the state shown in FIG. 4-2 is already completely operational and thermally protected. The steps shown in the embodiments of FIGS. 4-3 and 4-4 relate to additional fitting of a hermetically sealing outer bushing 110 using heat-shrinking technology. In an embodiment, the outer bushing 100 is a cold-shrinking or cast resin technology. The optionally fitted outer bushing 110 is used primarily for hermetically sealing cables which are arranged in an environment in which the cables require particular protection with respect to mechanical and/or chemical loads.

Figures 3, 5:
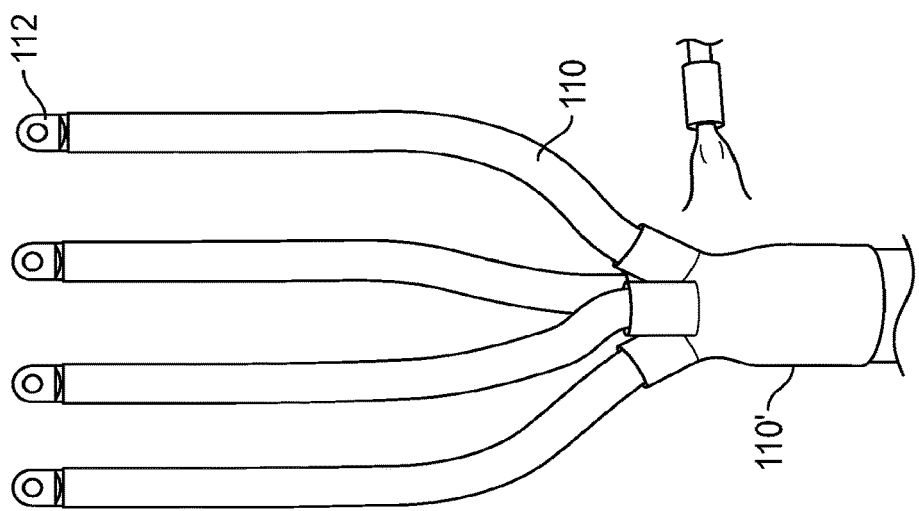
Figures 2, 5:
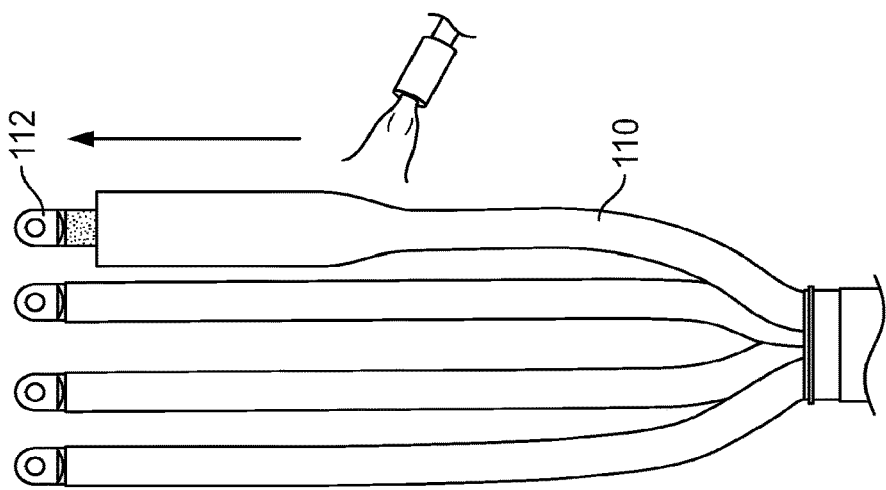
Figures 1, 5:
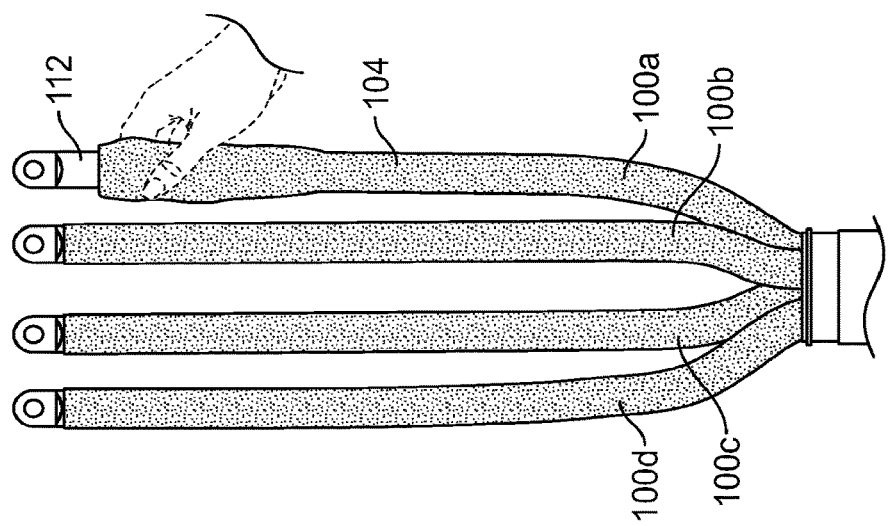

In an embodiment of FIG. 5 the individual strands or conductors 100a, 100b, 100c and 100d are connected to a terminating cable lug 112, and the connection location is covered with an insulating material (not visible in FIG. 5). Subsequently, as shown in FIG. 5-1, the outer casing 104 is pushed forwards as far as the contact regions of the cable lugs 112.

In the embodiments of FIGS. 5-2 and 5-3, first and second outer bushings 110 and 110' are assembled to hermetically seal and electrically safeguard the end closure arrangement.

Figure 6:
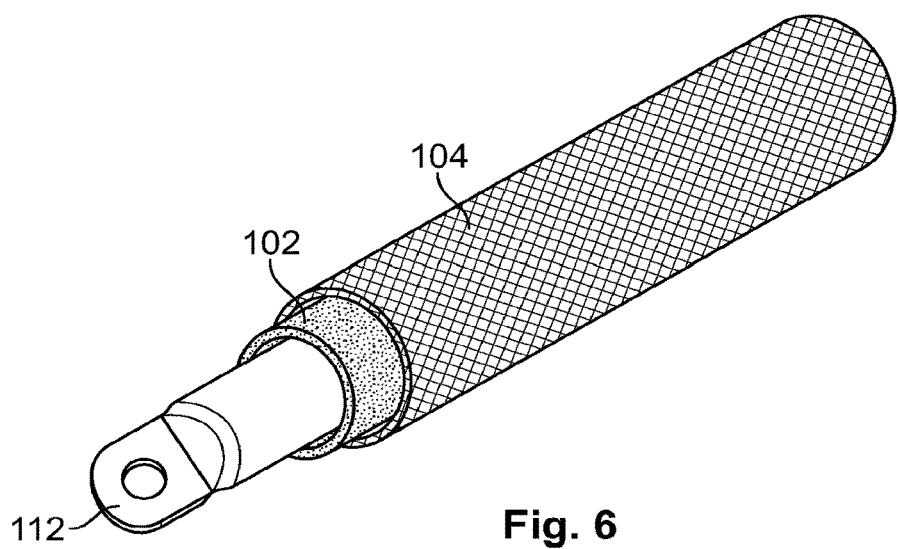
FIG. 6 is a perspective view of a cable jacket.
Figure 7:
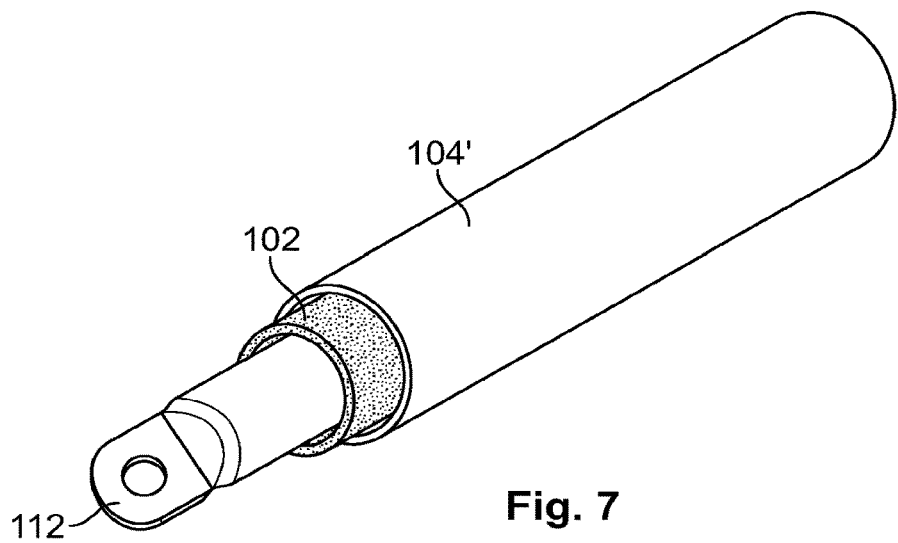
FIG. 7 is a perspective view of a cable jacket.
Figure 8:
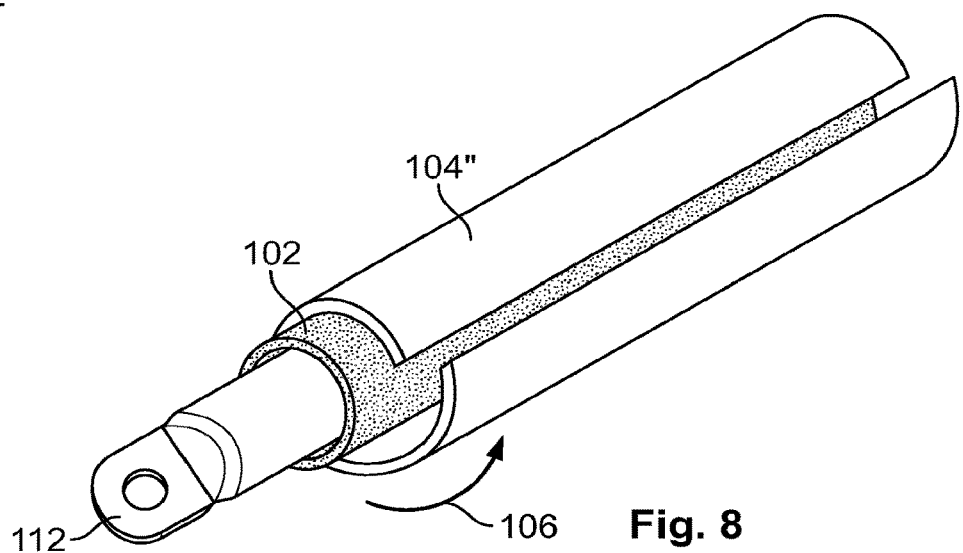
FIG. 8 is a perspective view of a cable jacket.

One of ordinary skill in the art would appreciate that the embodiments of FIGS. 1 to 3 are applicable to that of a cable end closure, which is disclosed in the embodiments of FIGS. 6 to 8.

In an embodiment of FIG. 6, an electrical conductor (not shown) having a cable lug 112 is surrounded by an insulation 102 and an outer casing 104 which may be constructed in an electrically insulating manner. The outer casing 104 fixes a large portion of the burnt insulation material 102 in place in the event of a fire, whilst allowing gases and vapours to dissipate. The insulation material 102 remaining in the event of a fire is retained at the original location, and a functionally enduring insulation is consequently maintained for a specific period of time. When a plurality of cable strands of differing polarity are connected to the cable lugs 112, the strand insulation is maintained. Furthermore, as mentioned, the burnt insulation 102, which is fixed in place by the outer casing 104, also forms a temperature barrier, which temporally delays the effects of the elevated external temperature on a copper conductor.

In an embodiment of FIG. 7, the outer casing 104' is a tubular, membrane-like structure made from glass fibre or quartz fibre.

In an embodiment of FIG. 8, the outer casing 104" is formed by a mat which is rectangular in the initial state, and which is placed in the direction of the arrow 106 around the insulation 102 on the cable lug 112.

In an embodiment, basalt is used in as an alternative to quartz for the outer casing 104. Basalt is a dark-grey to black, densely medium-grained volcanic stone. The basalt fibre is a 100% inorganic, mineral, continuous filament which can also be produced, for example, with a diameter of 11.0 μm. The physical properties of basalt are set out below in Table 2.

TABLE 2

| | Unit |
|---|---|
| Physical properties | |
| Diameter [μm] | 11.0 |
| Tear strength [mN/tex] | 433 |
| Modulus of elasticity [GPa] | 91-110 |
| Linear density [tex] | 121 |
| Flammability (LOI) [%] | 0.4 |
| Thermal application range [° C.] min | −260 |
| max. under pressure | +450 |
| max. without pressure | +700 |
| Operating temperature as flame limit | +1200 |
| Melting point [° C.] | 1450 |
| Moisture absorption [%] | ≤0.1 |
| Linear expansion coefficient [×$10^{-7}$/K] | 5.5 |
| Thermal conductivity [W/m · K] | 1.67 |
| Weight loss [%] after 3 hours of baking in: | |
| $H_2O$ | 99.6 |
| 0.5N NaOH | 93.4 |
| 2N NaOH | 6.4-77.3 |
| 2N $H_2SO_4$ | 66.4-98.5 |

In addition to the advantages already mentioned, the invention enables simple assembly of the outer casing 104, the position of the conductor 100 or the cable connection 112 after the assembly, that is to say, the orientation in the horizontal and vertical spatial direction, having no influence on the function of the maintenance.

The invention can advantageously be used not only with continuous conductors or cable strands or cable connections, but also with cable end closures.

What is claimed is:

1. A cable jacket for a conductor comprising:
   a flame-retardant insulation layer positioned on the conductor so as to at least partially surround the conductor, the insulation layer including an intumescent flame-retardant; and
   a gas-permeable, heat-resistant outer casing layer containing quartz and/or basalt that surrounds the flame-retardant insulation layer, the insulation layer and the outer casing layer being the only layers of the cable jacket.

2. The cable jacket of claim 1, wherein the outer casing layer is a flexible or resilient material.

3. The cable jacket of claim 1, wherein the outer casing layer includes a knitted fabric, a braided fabric or a woven fabric.

4. The cable jacket of claim 1, wherein the outer casing layer is constructed as a tube or a mat.

5. The cable jacket of claim 1, wherein the outer casing layer is produced from a quartz filament having a diameter of 5-15 μm.

6. The cable jacket of claim 1, wherein the outer casing layer is produced from a quartz filament having a diameter of 8-12 μm.

7. The cable jacket of claim 1, wherein the outer casing layer is produced from a quartz filament having a diameter of approximately 11 μm.

8. The cable jacket of claim 1, wherein the insulation layer includes a mineral flame-retardant.

9. The cable jacket of claim 1, wherein the outer casing layer is an outermost layer disposed around the conductor.

10. The cable jacket of claim 9, wherein the outer casing layer directly abuts the insulation layer and the insulation layer directly abuts the conductor.

11. A construction kit for producing a cable connection or a cable joint, comprising:
    a cable jacket including a fire-retardant insulation layer disposed on a conductor, the insulation layer including an intumescent flame-retardant, and an outer casing layer disposed on the insulation layer, the outer casing layer produced from a gas-permeable, heat-resistant material and including quartz and/or basalt, the insulation layer and the outer casing layer being the only layers of the cable jacket.

12. The construction kit according to claim 11, wherein the outer casing layer is mechanically flexible or resilient in an assembled state.

13. The construction kit of claim 11, wherein the outer casing layer includes a knitted fabric, a braided fabric or a woven fabric.

14. The construction kit of claim 11, wherein the outer casing layer is constructed as a tube or a mat.

15. The construction kit of claim 11, wherein the outer casing layer is produced from a quartz filament having a diameter of 5-15 μm.

16. The construction kit of claim 11, wherein the outer casing layer is produced from a quartz filament having a diameter of 8-12 μm.

17. The construction kit of claim 11, wherein the outer casing layer is produced from a quartz filament having a diameter of approximately 11 μm.

18. The construction kit of claim 11, wherein the insulation layer includes a mineral flame-retardant.

19. The construction kit of claim 11, further comprising an outer bushing formed of a shrinkable material surrounding the outer casing layer.

20. The construction kit of claim 11, further comprising a cable lug connected to an end of the conductor at a connection location, the insulation layer surrounding the connection location.

\* \* \* \* \*